R. H. WATERS.
METHOD OF MAKING SEMISOLID TIRES.
APPLICATION FILED AUG. 6, 1921.
1,428,508.
Patented Sept. 5, 1922.
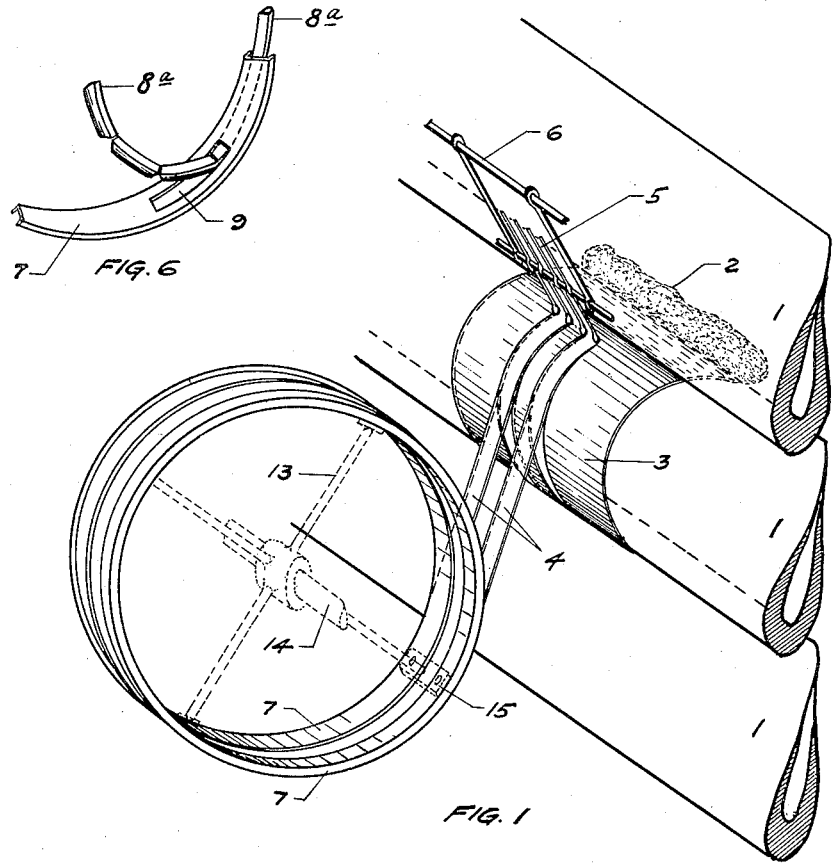
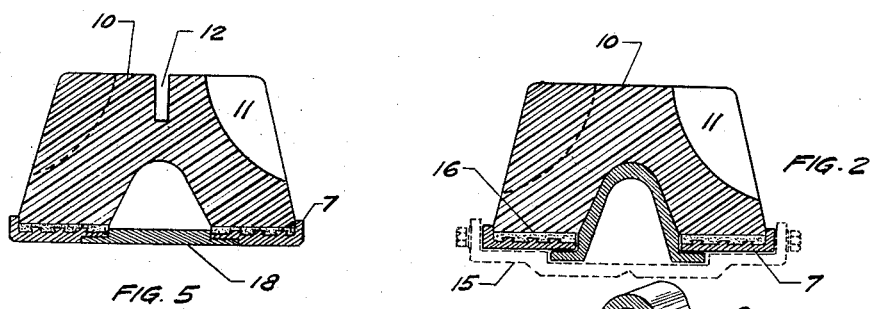
INVENTOR
Reginald H. Waters.

Patented Sept. 5, 1922.

UNITED STATES PATENT OFFICE.

1,428,508

REGINALD H. WATERS, OF CUMBERLAND, MARYLAND, ASSIGNOR TO KELLY-SPRINGFIELD TIRE COMPANY, OF NEW YORK, N. Y., A CORPORATION OF NEW JERSEY.

METHOD OF MAKING SEMISOLID TIRES.

Application filed August 6, 1921. Serial No. 490,293.

*To all whom it may concern:*

Be it known that I, REGINALD H. WATERS, a citizen of the United States, residing at Cumberland, in the county of Allegany and State of Maryland, have invented certain new and useful Improvements in Methods of Making Semisolid Tires, of which the following is a specification.

This invention relates to the manufacture of heavy duty semisolid tires such as are used on motor trucks and the like, and more especially to that type desired upon front wheels wherein a high degree of resiliency is essential to absorb the road shocks and prevent excessive vibration of the engine.

In the process of forming solid or semisolid tires two basic processes are practiced; first, the formation of the tire in lengths by the extruding method, and second the formation of them upon a permanent metallic base ring by winding thereon strips of unvulcanized rubber direct from the calender until the desired thickness has been attained; this latter type being that with which the present invention is more closely associated. Heretofore it has not been possible to provide for an internal opening in this laminated type of structure by the use of known methods and appliances, for instance, those in successful operation for similar purposes on the extruded type tire, for the obvious reason that the permanent base ring upon which laminated structures are wound precludes the use therewith of instrumentalities adapted to form the voids in the extruded structures. Thus, although the laminated structure has been proved to be structurally superior to the extruded type, the former has always been commercially handicapped by the limitation of an inherent lack of resiliency as compared with a semisolid of the latter type.

In the manufacture of semisolid structures by extruding, the material is made to initially conform to any desired cross sectional contour through the simple expedient of designing the die head to suit; the initial section impressed upon the flowing mass may include a permanent internal opening which is thereafter preserved by a rigid mandrel or other support during final vulcanization. The support used in preserving the internal opening as extruded may take the form of a withdrawable or fusible mandrel, the latter being adapted to disintegrate under the vulcanizing heat after it has stood up long enough to insure that the structure has become set; the form may be retained by an inflatable tube permanently embedded in the extruded opening, or, as is more common, the mold itself may be constructed with an annular ring or other means adapted to preserve the aforesaid opening. None of these devices is adapted for use in treating the laminated structure except the initial void be first created in a particular way.

It is, therefore, the object of this invention to form an annular resilient structure by wrapping laminated material about a permanent ring base leaving an annular internal void by manipulating the wrapping media and maintain said void during vulcanization whereby a semisolid structure is produced.

To the attainment of this object the invention comprises the novel method disclosed, as also the particular means employed as will more fully appear in the accompanying description, drawing and claims. It being particularly noted that the embodiment of the invention discloses means casually illustrative of the principle involved and that it may be practiced by those skilled in the art through the employment of a wide range of mechanical means without departing from the scope and spirit of the claims.

Referring particularly to the drawings:—

Figure 1 shows, in perspective, the preferred operation of building up the laminated structure; the illustration being somewhat diagrammatic.

Figure 2 shows, in cross section, a built up and fully molded tire prior to the removal of the core.

Figure 3 shows, in perspective, a portion of the core and a clamp attachment.

Figure 4 shows a cross section through a conventional mold, illustrating the associated positions of the tire, the core, and the rim during vulcanization.

Figure 5 shows a completed tire with the core removed and a closure piece fitted between the gaping edges of the rim.

Figure 6 shows, in perspective, a fragment of the tire rim with an articulated removable core withdrawable after vulcanization, through an orifice in the rim.

Particularly describing the disclosure: Numeral 1 represents generally the calender rolls of the well known hot process rubber machine; 2 a mass of rubber stock being drawn into the rolls; 3 the thin sheeted rubber; 4 the severed, or bifurcated winding strips being drawn onto the solid rim after having been severed to a predetermined width by knives indicated generally by 5. The knives are suitably mounted upon a carriage indicated generally by 6, and so arranged that they may be separately disengaged from cutting contact and also longitudinally adjustable along their carriage, as by tapping their fulcrum point with a light hammer.

The rim (7) upon which the tire is formed may be completely divided to afford a space for the core (8) which is generally indicated as a sectional demountable structure adapted to be withdrawn radially after the vulcanizing operation. The rim may, however, be intact except for a suitable slot (9) (see Fig. 6), being an alternative when using a core (8a) which is in the form of a flexible or articulated structure adapted to be withdrawn as presently described. The completed tire is generally indicated by 10; it being noted that staggered traction notches (11) of the well known type are generally indicated, the same being the product of the mold configuration. The tread surface of one illustration (see Fig. 5) is grooved at 12 and the particular tread ring mold for so forming it is illustrated in Fig. 4.

In the winding operation the rim (7) is suitably mounted on a spider (13) adjacent the calender and caused to rotate about a shaft (14) by suitable power means, not shown, whereby the strips (4) are drawn upon the rim. In the event of using an annularly divided rim, it is intended that the core (8) shall be interposed between the separated edges and the whole securely clamped by a member (15) adapted to aline the system and afford a seat for the arms of the spider (13); it being noted that the total width of the rim is preserved and properly spaced apart under molding pressure by the design of the core (8) which is provided with shoulders to this end. In connection with Fig. 1 attention is invited to the omission therein of any representation of the core (8), this being in the interest of clear illustration, it, however, being understood that the core is to be introduced within the aperture between the divided rim prior to starting the winding.

The usual procedure in operating under this disclosure is to coat the base of the rim with a hard rubber compound (16) preparatory to undertaking the regular winding. Assuming the system properly assembled with the core (8) or (8a) in position, the knives are first set to sever the sheeted stock (3) into two parallel strips (4) which are wound up on either side of the core (8).

As the winding proceeds it may be desirable to increase the width of the strips to roughly conform to the tapering sides of the particular core shown. This is readily accomplished by moving the two inner knives longitudinally along their carriage, as by tapping them lightly at intervals. When the winding has reached the depth of the core the two central knives are thrown off in order that the strip (4) may pull on as a unit width until the full depth of the structure has been attained. In the event that such a tire as in Figs. 4 and 5 is desired; that is, one having a tread groove, it is desirable that the stock be trimmed with this void present in the building, a matter only requiring that the central pair of knives be again applied, at proper gage, after they have been removed to form the solid portion lying between the top of the core void and the desired lower depth of the said groove. As the tread groove has no superposed wrapping, it does not require a core support prior to molding. The mold tread ring preserves the initial opening.

At the conclusion of the winding the spider is removed, the clamps (15) disconnected from the rim (7) and the tire put into the usual mold (17); for instance see Fig. 4. Upon completion of the molding process the core (8) is dismantled leaving the tire as in Fig. 5, but with no rim closure provided. If a divided type rim is used a series of closure pieces (18) (see Fig. 5) may be suitably set in, and preferably welded, in order that the structure shall have sufficient rigidity to stand shipment and the strain of being pressed on the usual felly.

In the preceding discussion an annular rigid core, such as 8, has been featured in connections with a divided rim member but it is apparent that the invention is not limited to any particular means for interiorly supporting the built up laminated structure by filling in the void left by the omission of a portion of the winding, nor is the particular form of rim of significance. For instance, a standard one piece rim can be used having means therein, such as one or more openings (9) (see Fig. 6), through which such a core as 8a can be withdrawn after vulcanizing. In fact, the operation would be simplified by the use of a unitary rim and, as for the core, that device may take a variety of forms. For instance, it could be an inflated tube which may remain permanently within the finished structure and serve as a pressure air chamber capable of being inflated in especially heavy service to diminish the resiliency of the structure.

It will be understood that the void initially formed in the wrapping of this type of tire would not be self sustaining for the reason that the tacky unvulcanized material would tend to deform and collapse into it under the pressure of winding successive layers and even if a partial void remains upon the completion of the winding, and minus a core, the subsequent molding under enormous pressure and high temperatures would cause the plastic mass to reunite. In view of the foregoing the two-fold function of the core feature becomes apparent; that is, to preliminarily form a guide and support for the formation of the void and finally to preserve the same during vulcanizing.

Having fully disclosed an embodiment of the invention in a practical form for manufacture whereby an entirely new type of laminated tire may be produced, the following claims are appended:

1. The method of producing a tire of the class described comprising the following steps: (*a*) winding a bifurcated strip upon an annular rim on either side of an annular support to the depth of said support; (*b*) continuing the winding with a unitary strip to the completion of the operation; (*c*) vulcanizing the structure; (*d*) removing the annular support.

2. The method of producing a tire of the class described comprising the following steps: (*a*) winding a separated strip of uncured rubber upon an annular rigid ring having a projection thereon adapted to separate and support said strip; (*b*) continuing the winding with a unitary strip; (*c*) vulcanizing the structure interiorly supported against collapse; (*d*) removing the interior support.

3. The method of producing a tire of the class described comprising the following steps: (*a*) winding unvulcanized strips upon a rim having thereon an annular exteriorly projecting support whereby the material is laid up on either side of said support to the full depth thereof; (*b*) thereafter winding further material thereon to completely cover said support; (*c*) vulcanizing the structure interiorly supported; (*d*) removing the interior support whereby a void is left in the completed structure.

4. The method of producing a tire of the class described comprising the following steps: (*a*) winding unvulcanized strips of material upon a rotating ring direct from a calender whereby the strip is first separated to form dual annuluses spaced apart and laterally supported by an annular projection on the rim; (*b*) continuing the winding radially outwardly of said support with a unitary strip; (*c*) vulcanizing the interiorly supported structure; (*d*) removing the interior support whereby an annular void is maintained interiorly of the structure adjacent the base rim.

In testimony whereof I affix my signature.

REGINALD H. WATERS.